(12) United States Patent
Fujitani

(10) Patent No.: US 12,110,834 B2
(45) Date of Patent: Oct. 8, 2024

(54) THROTTLE CONTROL SYSTEM AND THROTTLE CONTROL METHOD

(71) Applicant: TOYOTA JIDOSHA KABUSHIKI KAISHA, Toyota (JP)

(72) Inventor: Hiroshi Fujitani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 18/069,480

(22) Filed: Dec. 21, 2022

(65) Prior Publication Data

US 2023/0279822 A1    Sep. 7, 2023

(30) Foreign Application Priority Data

Jan. 28, 2022  (JP) ................. 2022-011980

(51) Int. Cl.
*F02D 41/22* (2006.01)
*F02D 9/10* (2006.01)
*F16K 31/04* (2006.01)
*F16K 37/00* (2006.01)

(52) U.S. Cl.
CPC ........... *F02D 41/221* (2013.01); *F02D 9/105* (2013.01); *F02D 9/1065* (2013.01); *F16K 31/047* (2013.01); *F16K 37/0083* (2013.01); *F02D 2041/228* (2013.01)

(58) Field of Classification Search
CPC ...... F02D 9/105; F02D 9/1065; F02D 41/221; F16K 1/221; F16K 31/043; F16K 31/047; F16K 31/535; F16K 37/0041; F16K 37/0083

USPC .............................. 73/114.31, 114.36, 114.79
See application file for complete search history.

(56) References Cited

U.S. PATENT DOCUMENTS 7,921,711 B2 *  4/2011  Noda ................ F02D 41/221
                                                      123/90.15
10,871,210 B2 * 12/2020  Bogen ............... F16K 31/047

FOREIGN PATENT DOCUMENTS

| CN | 113756971 A | * | 12/2021 | |
| DE | 102021132840 B4 | * | 5/2024 | ............ F02M 26/49 |
| JP | 2012-117500 A | | 6/2012 | |
| JP | 2015-81510 A | | 4/2015 | |
| JP | 2023-091292 A | | 6/2023 | |

OTHER PUBLICATIONS

Translation of CN 113756971.*
Translation of DE 102021132840.*

* cited by examiner

*Primary Examiner* — Kevin F Murphy
(74) *Attorney, Agent, or Firm* — Oblon, McClelland, Maier & Neustadt, L.L.P.

(57) ABSTRACT

A throttle control system includes a throttle device and a controller that controls the throttle device. The controller executes a driving process of driving the electric motor such that a target angular position of the specific gear continues to increase beyond or decrease below the initial position. The controller executes a determination process of determining that wear has occurred in the gear mechanism based on that a non-rotation time in which the angular position detected by the rotation sensor does not change during execution of the drive process being greater than or equal to a predetermined specified time.

6 Claims, 5 Drawing Sheets

THROTTLE CONTROL SYSTEM AND THROTTLE CONTROL METHOD

BACKGROUND

1. Field

The present disclosure relates to a throttle control system and a throttle control method.

2. Description of Related Art

Japanese Laid-Open Patent Application No. 2012-117500 describes a throttle control device for controlling a throttle device. The throttle device includes an electric motor having a drive shaft, a gear mechanism having gears, a driven shaft rotated by the gear mechanism, and a throttle valve selectively opened and closed by rotation of the driven shaft. The gear mechanism is driven by the rotation of the drive shaft. The throttle control device drives the electric motor so as to selectively open and close the throttle valve according to the depression degree of the accelerator pedal. When the opening degree of the throttle valve does not change even though the depression degree of the accelerator pedal changes, the throttle control device determines that an anomaly that the throttle valve is stuck has occurred.

In the gear mechanism of the throttle device described in the above publication, torque is applied to each gear by opening and closing the throttle valve. Therefore, when the gear mechanism is repeatedly driven, each gear is worn. However, the throttle control device described in the above-mentioned publication does not take the wear of the gears into consideration. That is, the throttle control device described in the above publication cannot determine wear of the gears of the gear mechanism.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one aspect of the present disclosure, a throttle control system is provided. The throttle control system includes a throttle device, and a controller configured to control the throttle device. The throttle device includes an electric motor including a drive shaft, a gear mechanism including a plurality of gears and configured to be driven by rotation of the drive shaft, a driven shaft configured to be rotated by the gear mechanism, a throttle valve configured to be selectively opened and closed by rotation of the driven shaft, a rotation sensor configured to obtain an angular position of a specific gear that is one of the gears, and a spring mechanism configured to urge the specific gear such that the angular position agrees with a predetermined initial position when receiving no torque from the electric motor or the driven shaft. The controller is configured to execute a driving process of driving the electric motor such that a target angular position of the specific gear continues to increase beyond or decrease below the initial position, and a determination process of determining that wear has occurred in the gear mechanism based on that a non-rotation time in which the angular position detected by the rotation sensor does not change during execution of the driving process is greater than or equal to a predetermined specified time.

In another aspect of the present disclosure, a method of controlling a throttle device is provided. The throttle device includes an electric motor having a drive shaft, a gear mechanism including a plurality of gears and configured to be driven by rotation of the drive shaft, a driven shaft that is rotated by the gear mechanism, a throttle valve configured to be selectively opened and closed by rotation of the driven shaft, a rotation sensor configured to acquire an angular position of a specific gear that is one of the gears, and a spring mechanism configured to urge the specific gear such that the angular position agrees with a predetermined initial position when receiving no torque from the electric motor or the driven shaft. The method includes executing a driving process of driving the electric motor such that a target angular position of the specific gear continues to increase beyond or decrease below the initial position, and determining that wear has occurred in the gear mechanism based on that a non-rotation time in which the angular position detected by the rotation sensor does not change during execution of the driving process is greater than or equal to a predetermined specified time.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

Hereinafter, a first embodiment of a throttle control system will be described with reference to the drawings. The throttle control system is employed in a vehicle.
<Schematic Configuration of Vehicle>

Figure 1:
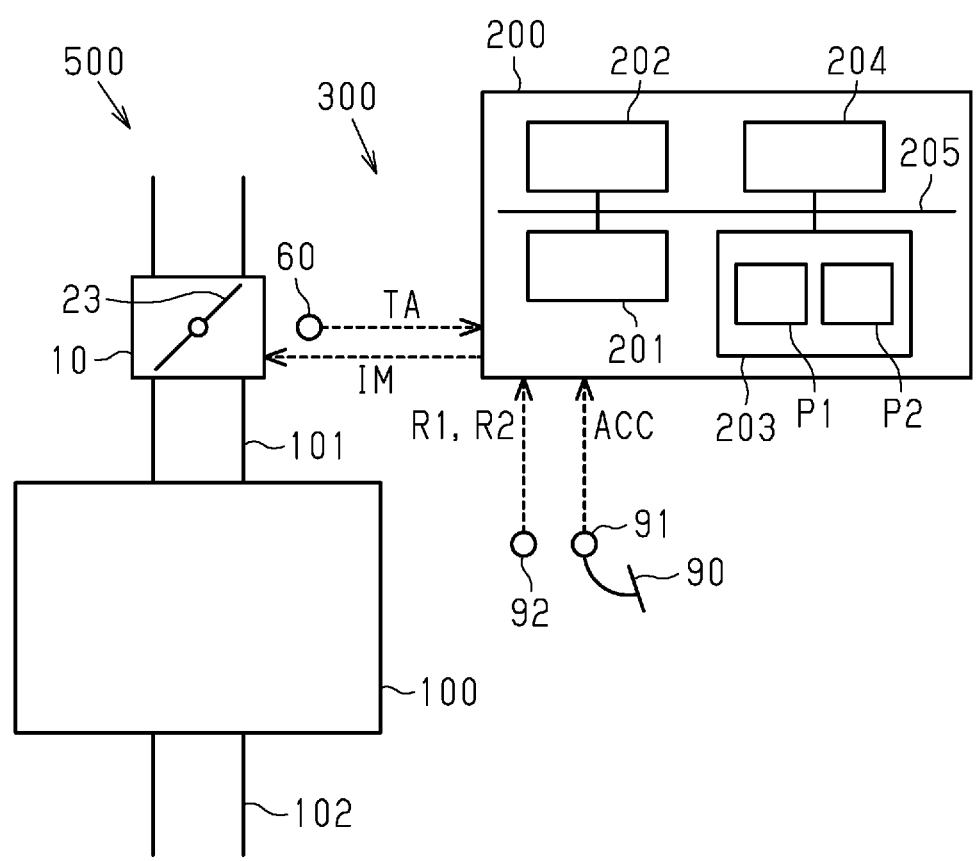
FIG. 1 is a schematic diagram of a vehicle.

As shown in FIG. 1, a vehicle 500 includes an internal combustion engine 100, an intake passage 101, and an exhaust passage 102. The internal combustion engine 100 is connected to an intake passage 101 that is a passage for introducing intake air from the outside of the vehicle 500. The internal combustion engine 100 is connected to an exhaust passage 102 that is a passage for discharging exhaust gas to the outside of the vehicle 500.

The vehicle 500 includes a throttle control system 300. The throttle control system 300 includes a throttle device 10 and a controller 200. The throttle device 10 is located in the middle of the intake passage 101. The throttle device 10 adjusts the amount of intake air flowing into the internal combustion engine 100.

The vehicle 500 includes an accelerator pedal 90 and an accelerator pedal sensor 91. The accelerator pedal sensor 91 is arranged in the vicinity of the accelerator pedal 90. The accelerator pedal sensor 91 outputs a signal indicating an accelerator depression degree ACC, which is a depression amount of the accelerator pedal 90.

The vehicle 500 includes an ignition switch 92. The ignition switch 92 is arranged in the vicinity of a driver's seat of the vehicle 500. When the ignition switch 92 is turned on in a state where the engine 100 is in a stopped state, the ignition switch 92 transmits a start request R1. When the ignition switch 92 is turned off in a state where the engine 100 is operating, the ignition switch 92 transmits a stop request R2.
<Throttle Device>

Figure 2:
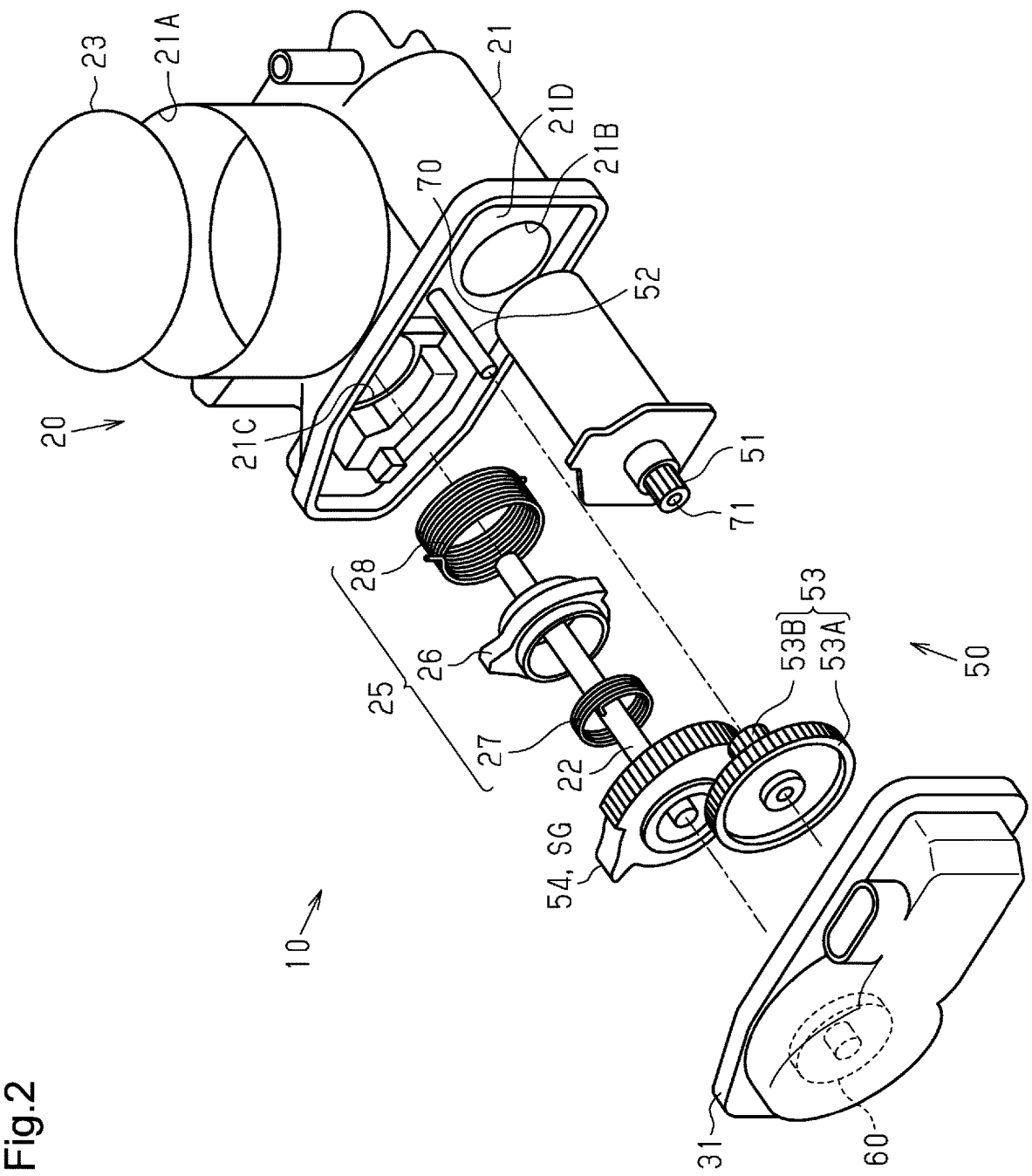
FIG. 2 is an exploded perspective view of a throttle device.

As shown in FIG. 2, the throttle device 10 includes a valve mechanism 20 and an electric motor 70.

The valve mechanism 20 includes a housing 21 and a cover 31. The housing 21 defines a valve accommodation space 21A. The valve accommodation space 21A is a cylindrical space. Both ends of the valve accommodation space 21A are open. The valve accommodation space 21A constitutes a part of the intake passage 101. Therefore, the intake air flows through the valve accommodation space 21A.

The housing 21 defines a motor accommodation space 21B. The motor accommodation space 21B is a cylindrical space. The central axis of the motor accommodation space 21B is orthogonal to the central axis of the valve accommodation space 21A. The motor accommodation space 21B is a space separated from the valve accommodation space 21A. Therefore, the motor accommodation space 21B is not connected to the valve accommodation space 21A. One end, that is, a first end of the motor accommodation space 21B is closed. The other end, that is, a second end of the motor accommodation space 21B is open to the outside of the housing 21.

The housing 21 defines a shaft hole 21C. The shaft hole 21C is a cylindrical space. The central axis of the shaft hole 21C is orthogonal to the central axis of the valve accommodation space 21A. Further, the central axis of the shaft hole 21C intersects with the central axis of the valve accommodation space 21A. One end, that is, a first end of the shaft hole 21C is open to the valve accommodation space 21A. The other end, that is, a second end of the shaft hole 21C is open to the outside of the housing 21. The second end of the shaft hole 21C is located on the same side as the second end of the motor accommodation space 21B.

The cover 31 covers a part of the housing 21. The cover 31 covers the motor accommodation space 21B and the opening of the shaft hole 21C. The cover 31 and the housing 21 define a gear accommodation space 21D. The gear accommodation space 21D is connected to both the motor accommodation space 21B and the shaft hole 21C.

The valve mechanism 20 has a driven shaft 22. The driven shaft 22 is rod-shaped. The driven shaft 22 passes through the shaft hole 21C. Although not shown, the driven shaft 22 is supported by the housing 21 with bearings and is rotatable relative to the housing 21.

The valve mechanism 20 includes a throttle valve 23. The throttle valve 23 is located in the valve accommodation space 21A. The throttle valve 23 has a disk shape. The throttle valve 23 has a diameter slightly smaller than the inside diameter of the valve accommodation space 21A. The throttle valve 23 is fixed to the driven shaft 22. The throttle valve 23 rotates together with the driven shaft 22. Therefore, the throttle valve 23 is selectively opened and closed by the rotation of the driven shaft 22.

The valve mechanism 20 has a spring mechanism 25. The spring mechanism 25 includes a joint 26, a first spring 27, and a second spring 28. The joint 26 has a substantially cylindrical shape. One of the joints 26 is open, and the other is closed. That is, the joint 26 has a bottom surface. The above-described driven shaft 22 extends through the bottom surface of the joint 26. The joint 26 is held by the driven shaft 22. The first spring 27 is located in the joint 26. The first spring 27 is a coil spring. The first spring 27 applies torque in one direction to the joint 26. The second spring 28 is located outside the joint 26. The second spring 28 surrounds the joint 26. The second spring 28 applies a torque to the joint 26 in a direction opposite to that of the first spring 27. When no external force is applied to the valve mechanism 20, the angular position TA of the driven shaft 22 is maintained at the initial position X by the torque from the first spring 27 and the second spring 28. The initial position X is determined as an angular position TA of the driven shaft 22 for achieving an opening degree of the throttle valve 23 that allows intake air required for the evacuation traveling to flow in the valve accommodation space 21A. The opening degree of the throttle valve 23 when the angular position TA of the driven shaft 22 is at the initial position X is, for example, several percent.

The electric motor 70 is located in the motor accommodation space 21B. The electric motor 70 has a drive shaft 71. The drive shaft 71 is located in the gear accommodation space 21D. The drive shaft 71 extends in parallel with the driven shaft 22. The electric motor 70 transmits torque to the driven shaft 22 via the gear mechanism 50. That is, the electric motor 70 is a drive source of the throttle valve 23. The electric motor 70 is connected to a battery (not shown).

The throttle device 10 includes a gear mechanism 50. The gear mechanism 50 includes gears and is driven by the rotation of the drive shaft 71. Specifically, the gear mechanism 50 includes a drive gear 51, a support shaft 52, a first driven gear 53, and a second driven gear 54. The drive gear 51 is a spur gear. The drive gear 51 is held by the drive shaft 71. The drive gear 51 rotates integrally with the drive shaft 71. The drive gear 51 is made of a metal.

The support shaft 52 extends from the housing 21. The support shaft 52 extends in parallel with the drive shaft 71. The support shaft 52 is positioned between the drive shaft 71 and the driven shaft 22.

The first driven gear 53 is held at an end of the support shaft 52. The first driven gear 53 has a large-diameter gear 53A and a small-diameter gear 53B. The large-diameter gear 53A and the small-diameter gear 53B are spur gears. The outer diameter of the large-diameter gear 53A is larger than the outer diameter of the drive gear 51. The outer diameter of the large-diameter gear 53A is larger than the outer diameter of the small-diameter gear 53B. The large-diameter gear 53A is located coaxially with the small-diameter gear 53B. The large-diameter gear 53A is integral with the small-diameter gear 53B. The large-diameter gear 53A meshes with the drive gear 51. The first driven gear 53 outputs the rotation of the drive gear 51 after decelerating the rotation. The first driven gear 53 is made of a plastic.

The second driven gear 54 is a spur gear. The second driven gear 54 meshes with the small-diameter gear 53B. The second driven gear 54 is held by the driven shaft 22. Therefore, the second driven gear 54 rotates integrally with the driven shaft 22. That is, the driven shaft 22 is rotated by the gear mechanism 50. The second driven gear 54 is made of a plastic.

Thus, the torque is transmitted from the drive shaft 71 of the electric motor 70 to the driven shaft 22, to which the throttle valve 23 is fixed, via the three gears of the gear mechanism 50. As described above, on the torque transmission path from the electric motor 70 to the driven shaft 22, the gears are arranged in the order of the drive gear 51, the large-diameter gear 53A, the small-diameter gear 53B, and the second driven gear 54 from the upstream side.

The throttle device 10 includes a rotation sensor 60. The rotation sensor 60 is a sensor that acquires an angular position TA of a specific gear SG that is one of the gears included in the gear mechanism 50. In the present embodiment, the specific gear SG is the second driven gear 54. Therefore, the rotation sensor 60 is a sensor that acquires the angular position TA of the second driven gear 54.

The rotation sensor 60 is built in the cover 31. The rotation sensor 60 is located in the vicinity of the driven shaft 22. The rotation sensor 60 is a so-called Hall type non-contact sensor that detects the angular position TA of the driven shaft 22 as a change in a magnetic field. As described above, since the second driven gear 54 rotates integrally with the driven shaft 22, the angular position TA of the driven shaft 22 is equal to the angular position TA of the second driven gear 54. That is, in the present embodiment, the angular position TA of the second driven gear 54 is acquired by acquiring the angular position TA of the driven shaft 22.

<Controller>

The controller 200 controls the throttle device 10. As shown in FIG. 1, the controller 200 acquires the accelerator opening degree ACC output by the accelerator pedal sensor 91. The controller 200 acquires the start request R1 and the stop request R2 transmitted from the ignition switch 92. The controller 200 acquires the angular position TA output by the rotation sensor 60. In the following description, the angular position TA when the throttle valve 23 is in the fully closed state is defined as 0. As the opening degree of the throttle valve 23 increases, the angular position TA also increases.

The controller 200 includes a CPU 201, a peripheral circuit 202, a ROM 203, a storage device 204, and a bus 205. The bus 205 communicatively couples the CPU 201, the peripheral circuitry 202, the ROM 203, and the storage device 204 to one another. The peripheral circuit 202 includes circuits such as a circuit that generates a clock signal that defines an internal operation, a power supply circuit, and a reset circuit. The ROM 203 stores in advance various programs for the CPU 201 to execute various controls. The CPU 201 controls the throttle device 10 by executing various programs stored in the ROM 203. The ROM 203 stores a normal program P1 and a gear wear determination program P2.

When the CPU 201 acquires the start request R1, the CPU 201 repeatedly execute the normal program P1. The CPU 201 calculates the target angular position TTA in accordance with the magnitude of the acquired accelerator opening degree ACC. The CPU 201 calculates the target angular position TTA such that the target throttle opening degree increases as the accelerator depression degree ACC increases. The CPU 201 supplies a current IM corresponding to the calculation result to the electric motor 70. When the CPU 201 acquires the stop request R2, the CPU 201 stops the execution of the normal program P1. That is, when the engine 100 is being driven, the CPU 201 repeatedly executes the normal program P1.

When the amount of deviation between the target angular position TTA and the angular position TA is larger than a predetermined amount, the CPU 201 controls the electric motor 70 so as to reduce the amount of deviation. For example, when the angular position TA is smaller by a certain amount than the target angular position TTA, the CPU 201 controls the current IM supplied to the electric motor 70 so as to increase the angular position TA.

<Series of Processes for Determining Wear of Gear Mechanism>

When the CPU 201 acquires the stop request R2, the CPU 201 executes the gear wear determination program P2 once.

Figure 3:
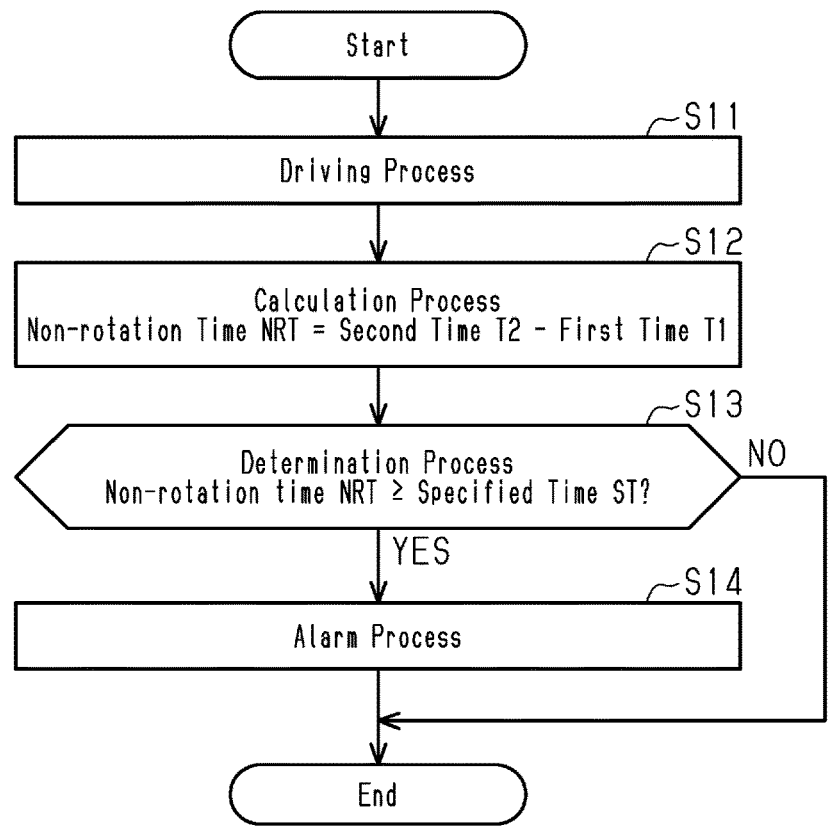
FIG. 3 is a flowchart of a series of processes for determining wear of a gear mechanism according to a first embodiment.

As shown in FIG. 3, when the gear wear determination program P2 is started, the CPU 201 first performs the processing of step S11. In step S11, the CPU 201 performs a driving process. The driving process is a process of driving the electric motor 70 at a constant speed so that the target angular position TTA of the specific gear SG continues to increase beyond the initial position X.

Figure 4:
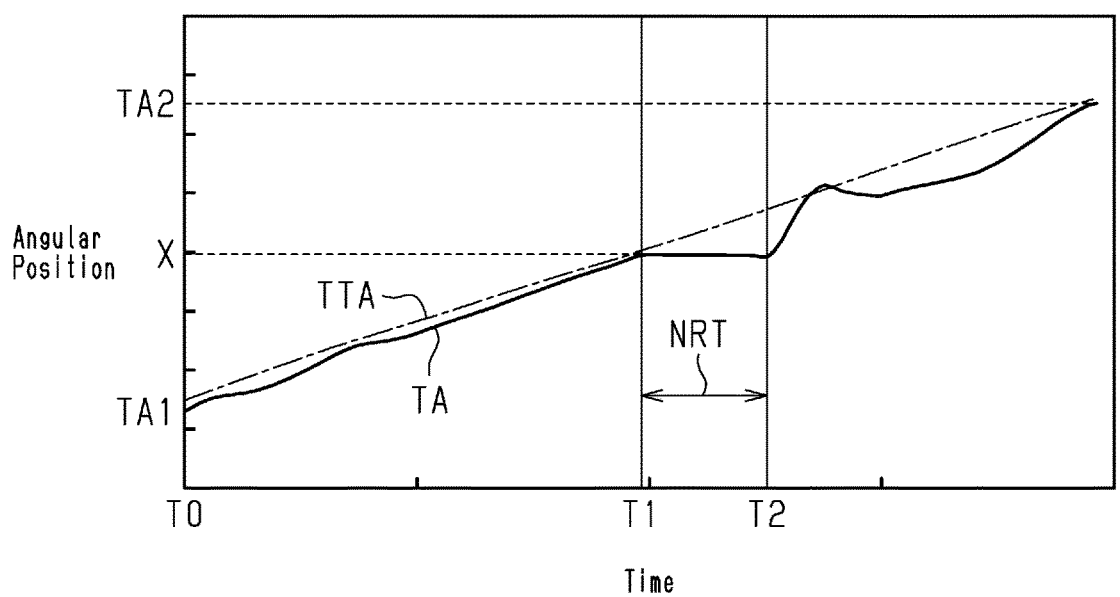
FIG. 4 is a time chart of an angular position during execution of a driving process.

Specifically, as shown in FIG. 4, the CPU 201 drives the electric motor 70 such that the angular position TA becomes a first position TA1, which is smaller than the initial position X by a predetermined amount. Next, the CPU 201 drives the electric motor 70 at a constant speed such that the target angular position TTA becomes a second position TA2, which is larger than the initial position X by a predetermined amount. Then, the CPU 201 stores the time series data of the angular position TA in the storage device 204 until the target angular position TTA of the specific gear SG changes from the first position TA1 to the second position TA2. The constant speed mentioned here allows for changes in speed due to a tolerance in control. Thereafter, as shown in FIG. 3, the CPU 201 proceeds the process to step S12.

In step S12, CPU 201 performs a calculation process of a non-rotation time NRT. As shown in FIG. 4, the non-rotation time NRT is a time period during which the angular position TA detected by the rotation sensor 60 does not change while the driving process is executed. The CPU 201 calculates the non-rotation time NRT based on the time series data of the angular position TA stored in the storage device 204. For example, the CPU 201 defines, as first time T1, a point in time at which the angular position TA becomes the initial position X for the first time during the execution of the driving process. Next, the CPU 201 defines, as a second time T2, a point in time at which the angular position TA becomes larger than the initial position X after the first time T1. Then, the CPU 201 calculates the time period from the first time T1 to the second time T2 as the non-rotation time NRT.

When the angular position TA is within a predetermined range including the initial position X, the CPU 201 determines that the angular position TA has not changed from the initial position X. Then, the CPU 201 defines, as a second time T2, a point in time at which the angular position TA exceeds the predetermined range after the first time T1. The predetermined range is defined as a range in which it is possible to distinguish a change in the angular position TA due to noise or the like superimposed on the output signal of the rotation sensor 60 from a change in the angular position TA due to actual rotation of the second driven gear 54. Thereafter, as shown in FIG. 3, the CPU 201 proceeds the process to step S13.

In step S13, the CPU 201 executes determination process for determining whether wear has occurred in the gear mechanism 50. The CPU 201 determines whether wear has occurred in the gear mechanism 50 based on the fact that the non-rotation time NRT calculated in the calculation process of step S12 is greater than or equal to a predetermined specified time ST. Specifically, when the non-rotation time NRT is greater than or equal to the specified time ST, the CPU 201 determines that wear has occurred in the gear mechanism 50. On the other hand, when the non-rotation time NRT is less than the specified time ST, the CPU 201 determines that wear has not occurred in the gear mechanism 50. The specified time ST is determined in advance by a test or a simulation. Specifically, the non-rotation time NRT is actually measured when the driving process is executed in a state where a predetermined amount of wear has occurred in the gear mechanism 50. Then, the specified time ST is determined based on the actually measured non-rotation time NRT.

When the CPU 201 determines that wear has not occurred in the gear mechanism 50 (S13: NO), the CPU 201 terminates the process of the gear wear determination program P2. On the other hand, when the CPU 201 determines that wear has not occurred in the gear mechanism 50 (S13: YES), the CPU 201 proceeds the process to step S14.

In step S14, the CPU 201 executes an alarm process. In the alarm process, the CPU 201 outputs an alarm signal. Then, for example, the CPU 201 turns on an alarm lamp indicating that the gear mechanism 50 is worn. Thereafter, the CPU 201 terminates the process of the gear wear determination program P2.

Operation of First Embodiment

A contact state between teeth of the second driven gear 54 and teeth of the small-diameter gear 53B during the execution of the driving process will be described. The rotation direction of the second driven gear 54 when the second driven gear 54 rotates such that the angular position TA decreases is referred to as a first rotation direction. The rotation direction of the second driven gear 54 when the second driven gear 54 rotates so as to increase the angular position TA is referred to as a second rotation direction D2.

Figure 5:
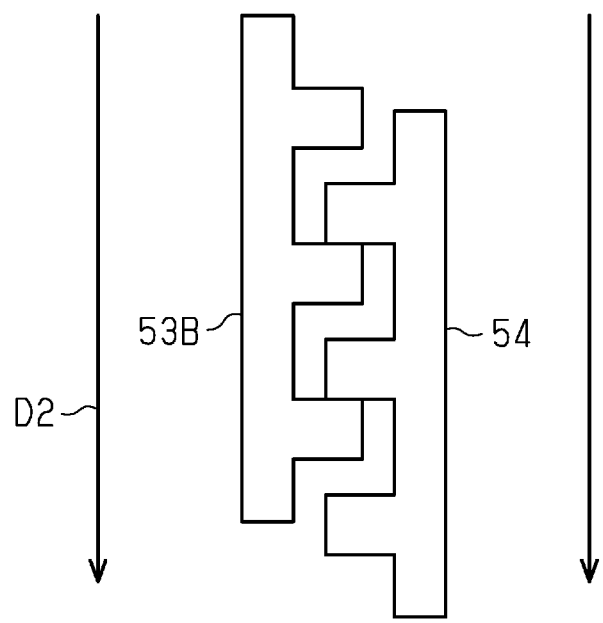
FIG. 5 is a schematic diagram showing a meshing state of a throttle gear and an intermediate gear.

As shown in FIG. 4, the point in time at which the angular position TA of the second driven gear 54 reaches the first position TA1 is referred to a start time T0. During a time period from the start time T0 to before the first time T1, the angular position TA is smaller than the initial position X. When the angular position TA is less than the initial position X, the second driven gear 54 receives the torque in the second rotational direction D2 by the first spring 27. Therefore, as shown in FIG. 5, the surface of the teeth of the second driven gear 54 on a leading side in the second rotation direction D2 collides with the first driven gear 53.

As shown in FIG. 4, at the first time T1, at which the angular position TA is the initial position X, the second driven gear 54 no longer receives the torque in the second rotational direction D2 from the first spring 27. On the other hand, as the target angular position TTA increases, the small-diameter gear 53B rotates in the second rotational direction D2. Therefore, the surface of the teeth of the second driven gear 54 on the leading side in the second rotation direction D2 is separated from the small-diameter gear 53B. Therefore, the second driven gear 54 is not rotated while the small-diameter gear 53B is being rotated.

Figure 6:
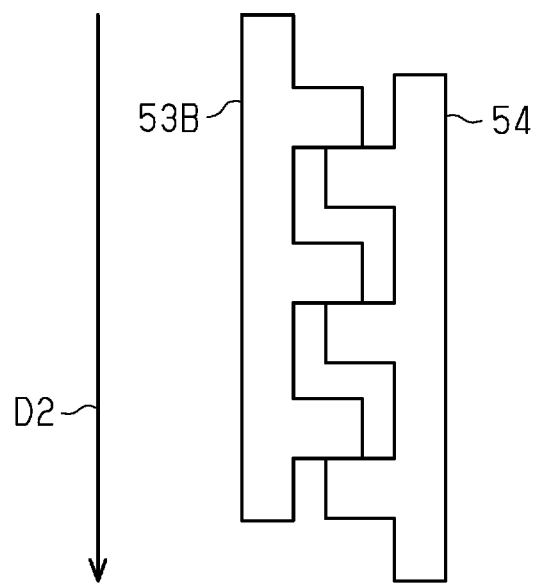
FIG. 6 is a schematic diagram showing a meshing state of the throttle gear and the intermediate gear.

As shown in FIG. 6, when the small-diameter gear 53B is being rotated at the second time T2, the surface of the teeth of the small-diameter gear 53B on the leading side in the second rotation direction D2 collides with the second driven gear 54. In other words, during the time period from the first time T1 to the second time T2, the small-diameter gear 53B is rotating while the second driven gear 54 is not rotating.

As shown in FIG. 4, after the second time T2, CPU 201 increases the current IM supplied to the electric motor 70 due to the increase in the amount of deviation between the target angular position TTA and the angular position TA. For this reason, the angular position TA rapidly increases by an amount greater than an amount by which the target angular position TTA increases.

Generally, there is a certain amount of gap between the gears even if all the gears are not worn. Therefore, the state in which the small-diameter gear 53B is rotating while the second driven gear 54 is not rotating also occurs although all the gears of the gear mechanism 50 are not worn. However, when wear occurs in any of the gears of the gear mechanism 50, the gap between the worn gear and the gear meshing with the worn gear becomes larger than that in a case where wear has not occurred. Accordingly, when wear occurs in any of the gears of the gear mechanism 50, the non-rotation time NRT from the first time T1 to the second time T2 becomes longer.

For example, when wear occurs in the second driven gear 54, the gaps between the teeth of the second driven gear 54 and the teeth of the small-diameter gear 53B become larger. Therefore, the point in time at which the surface of the teeth of the small-diameter gear 53B on the leading side in the second rotation direction D2 collides with the second driven gear 54 is delayed. In other words, the second time T2 is delayed in comparison with a case in which the second driven gear 54 is not worn. As a result, the non-rotation time NRT from the first time T1 to the second time T2 is increased.

Advantages of First Embodiment (1-1) According to the first embodiment, the gaps between the gears from the electric motor 70 to the second driven gear 54, which is the specific gear SG, is detected based on the length of the non-rotation time NRT. The gaps between the gears substantially directly reflect the wear of the gears. Therefore, according to the above-described series of processes of the first embodiment, the determination that wear has occurred in the gear mechanism 50 is performed accurately.

(1-2) According to the first embodiment, the specific gear SG is the second driven gear 54 that rotates integrally with the driven shaft 22. Therefore, a sensor for acquiring the opening degree of the throttle valve 23 can be used as the rotation sensor 60. Therefore, it is not necessary to provide an additional sensor exclusively for detecting the angular position TA of the specific gear SG.

According to the first embodiment, the specific gear SG is located on the most downstream side in the torque transmission path from the electric motor 70 to the driven shaft 22. Therefore, even if any gear among the gears of the gear mechanism 50 is worn, the determination process determines that wear has occurred in the gear mechanism 50.

(1-3) According to the first embodiment, the first driven gear 53 and the second driven gear 54 are made of plastic. That is, both the first driven gear 53, which is a gear between the specific gear SG and the electric motor 70, and the second driven gear 54, which is the specific gear SG, are likely to wear to a certain extent. According to the above-described embodiment, since the angular position TA of the second driven gear 54 is detected, it is possible to detect wear of the gear mechanism 50 with respect to the first driven gear 53 and the second driven gear 54, which are likely to wear.

(1-4) According to the first embodiment, the CPU 201 outputs the alarm signal by the alarm process. Then, by operating the alarm lamp based on the alarm signal, it is possible to notify the user of the occurrence of wear in the gear mechanism 50.

Second Embodiment

Hereinafter, a second embodiment of the throttle control system will be described with reference to the drawings. Description of configurations similar to those of the first embodiment will be simplified or omitted. The second embodiment is different from the first embodiment in some processes in the gear wear determination program P2. These differences will be mainly described below.

<Series of Processes for Determining Wear of Gear Mechanism>

In the second embodiment, when the CPU 201 acquires the stop request R2, the CPU 201 executes the gear wear determination program P2 once.

Figure 7:
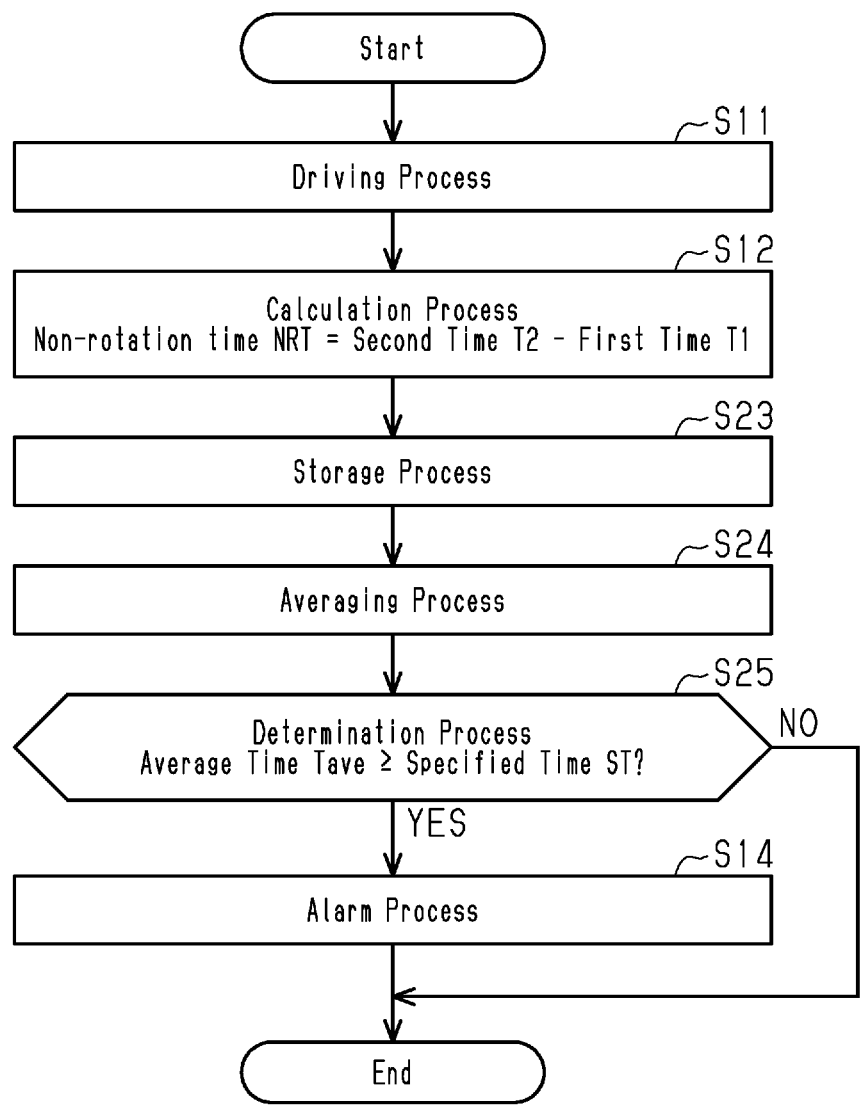
FIG. 7 is a flowchart showing a series of processes for determining wear of the gear mechanism according to a second embodiment.

As shown in FIG. 7, when the gear wear determination program P2 is started, the CPU 201 first performs the process of step S11. The driving process of step S11 is the same as that of the first embodiment. After the driving process, as shown in FIG. 7, the CPU 201 proceeds the process to step S12.

In step S12, the CPU 201 performs a calculation process of the non-rotation time NRT. The calculation process is the same as that of the first embodiment. After performing the calculation process, the CPU 201 proceeds the process to step S23.

In step S23, the CPU 201 executes a storage process. The storage process is a process of storing values of the non-rotation time NRT calculated in step S12. Specifically, the storage process stores values of the non-rotation time NRT that correspond to a predetermined number of consecutive cycles in order from the latest one. The CPU 201 updates the data of the non-rotation time NRT that correspond to multiple cycles stored in the storage device 204. First, the CPU 201 stores the value of the non-rotation time NRT calculated in the immediately preceding calculation process as the latest one. Next, the CPU 201 updates the values of the non-rotation time NRT corresponding to multiple cycles, which were stored in the previous cycle of the storage process, except for the oldest value, by labeling the respective values as one cycle old. As a result, the CPU 201 stores, in the storage device 204, values of the non-rotation time NRT that correspond to multiple cycles in order from the latest one. Thereafter, the CPU 201 proceeds the process to step S24. The multiple cycles are, for example, 25 cycles.

In step S24, the CPU 201 executes an averaging process. The CPU 201 calculates an average time Tave, which is the average of the values of the non-rotation times NRT that correspond to the multiple cycles stored in step S23. The average time Tave is the arithmetic average of the values of the non-rotation time NRT corresponding to the multiple cycles. When the number of the stored values of the non-rotation times NRT does not reach the predetermined number of cycles, the average time Tave is set to the arithmetic average of all the stored values of the non-rotation times NRT. Thereafter, the CPU 201 proceeds the process to step S25.

In step S25, the CPU 201 executes a determination process for determining whether wear has occurred in the gear mechanism 50. The CPU 201 determines whether wear has occurred in the gear mechanism 50 by comparing the average time Tave calculated in the averaging process of the step S24 with the specified time ST. For example, when the average time Tave is greater than or equal to the specified time ST, the CPU 201 determines that wear has occurred in the gear mechanism 50. On the other hand, when the average time Tave is less than the specified time ST, the CPU 201 determines that wear has not occurred in the gear mechanism 50. When the average time Tave is greater than or equal to the specified time ST, one or more of the values of non-rotation time NRT are greater than or equal to the specified time ST. That is, the determination by the CPU 201 that the average time Tave is greater than or equal to the specified time ST is based on the determination that the non-rotation time NRT is greater than or equal to the specified time ST.

When the CPU 201 determines that wear has not occurred in the gear mechanism 50 (S25: NO), the CPU 201 terminates the process of the gear wear determination program P2. On the other hand, when the CPU 201 determines that wear has not occurred in the gear mechanism 50 (S25: YES), the CPU 201 proceeds the process to step S14. Step S14 is an alarm process similar to that of the first embodiment. After performing the alarm process, the CPU 201 terminates the process of the gear wear determination program P2.

Advantages of Second Embodiment (2-1) According to the second embodiment, the CPU 201 determines that wear has occurred in the gear mechanism 50 when the average time Tave, which is the average of the values of the non-rotation time NRT, is greater than or equal to the specified time ST. Therefore, it is possible to reduce the influence of the variation in the non-rotation time NRT in each cycle with respect to one driving process, compared to a case where it is determined that wear has occurred in the gear mechanism 50 when the non-rotation time NRT in a single cycle is greater than or equal to the specified time ST.

Other Embodiments

Each of the above-described embodiments can be modified as follows. The embodiments and the following modifications can be combined with each other as long as there is no technical contradiction.

The valve mechanism 20 is not limited to the configuration of the embodiments described above. For example, the housing 21 does not necessarily need to define the motor accommodation space 21B, and another housing defining the motor accommodation space 21B may be provided.

The spring mechanism 25 may be modified as long as the spring mechanism 25 urges the specific gear SG such that the angular position TA of the specific gear SG is the initial position X when receiving no torque from the electric motor 70 and the driven shaft 22. For example, another member may be interposed between the first spring 27 and the joint 26, or the first spring 27 may urge the first driven gear 53.

The number of gears included in the gear mechanism 50 may be two, or may be four or more.

The material of each gear of the gear mechanism 50 is not limited to the example of each embodiment described above. For example, the material of the first driven gear 53 and the second driven gear 54 may be metal such as carbon steel or stainless steel. Among the plurality of gears, the material of one or more gears selected from the gear existing between the specific gear SG and the electric motor 70 on the transmission path of the torque from the electric motor 70 to the driven shaft 22 and the specific gear SG may be plastic. In this case, a gear whose wear can be determined by the non-rotation time NRT includes a gear made of plastic, which is relatively easily worn.

The specific gear SG does not necessarily need to be the second driven gear 54. The specific gear SG may be the first driven gear 53 or the drive gear 51. In this case, a sensor that acquires the angular position TA of the specific gear SG may be provided as the rotation sensor 60.

The controller 200 may be configured as circuitry including one or more processors that execute various processes in accordance with a computer program (software). The controller 200 may be configured as one or more dedicated hardware circuits such as an application specific integrated circuit (ASIC) that executes at least a part of various processes, or a circuit including a combination thereof. The processor includes a CPU and memory such as RAM and ROM. The memory stores program code or instructions configured to cause the CPU to perform operations. Memory or computer-readable media includes any available media that can be accessed by general purpose computers or dedicated computers.

The CPU 201 may notify the user of the occurrence of wear in the gear mechanism 50 by another operation based on the alarm signal. For example, when acquiring the alarm signal, the CPU 201 may send, to a display mounted in the vehicle 500, a message indicating that the gear mechanism 50 needs to be replaced. Further, for example, when the CPU 201 acquires the alarm signal, the CPU 201 may send a message indicating that the gear mechanism 50 needs to be replaced to a smartphone communicating with the vehicle 500. In addition, the CPU 201 does not necessarily need to perform the alarm process.

As the driving process, the CPU 201 may drive the electric motor 70 at a constant speed such that the target angular position TTA of the specific gear SG continues to decrease below the initial position X. Even in this case, the gap between the gears of the gear mechanism 50 is detected based on the magnitude of the non-rotation time NRT.

The CPU 201 does not necessarily need to drive the electric motor 70 at a constant speed in the driving process. As long as the electric motor 70 is driven in the same manner in each driving process, the rotation speed of the drive shaft 71 may be changed until the target angular position TTA is changed from the first position TA1 to the second position TA2.

The CPU 201 may calculate the non-rotation time NRT by another method. For example, the CPU 201 may calculate a differential value of the time-series data of the angular position TA, and set the first time T1 to a point in time when the differential value becomes zero. Further, the second time T2 may be set to a point in time when the differential value changes from zero to a positive value In the second embodiment, when the gear wear determination program P2 is executed once, the CPU 201 may proceed to step S24 after repeating the processes from step S11 to step S23 a predetermined number of times. That is, the CPU 201 may execute the driving process and the calculation process a plurality of times when the stop request R2 is acquired once.

In the first embodiment, the CPU 201 may determine that wear has occurred in the gear mechanism 50 when the number of times that the non-rotation time NRT becomes greater than or equal to the specified time ST is greater than a predetermined number of times. For example, when the gear wear determination program P2 is executed once, the process from step S11 to step S13 may be repeated a predetermined number of times. In addition, for example, in step S13, the CPU 201 stores the number of times that the non-rotation time NRT becomes greater than or equal to the specified time in the storage device 204. Then, by executing the gear wear determination program P2 a plurality of times, it may be determined that wear has occurred in the gear mechanism 50 when the number of times reaches a predetermined number of times. Even in this case, the controller 200 determines that wear has occurred in the gear mechanism 50 based on the fact that the non-rotation time NRT is longer than or equal to the specified time ST.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A throttle control system comprising:
   a throttle device; and
   a controller configured to control the throttle device, wherein,
   the throttle device includes:
   an electric motor including a drive shaft;
   a gear mechanism including a plurality of gears and configured to be driven by rotation of the drive shaft;
   a driven shaft configured to be rotated by the gear mechanism;
   a throttle valve configured to be selectively opened and closed by rotation of the driven shaft;
   a rotation sensor configured to obtain an angular position of a specific gear that is one of the gears; and
   a spring mechanism configured to urge the specific gear such that the angular position agrees with a predetermined initial position when receiving no torque from the electric motor or the driven shaft,
   the controller is configured to execute a driving process of driving the electric motor such that a target angular position of the specific gear continues to increase beyond or decrease below the initial position; and a determination process of determining that wear has occurred in the gear mechanism based on that a non-rotation time in which the angular position detected by the rotation sensor does not change during execution of the driving process is greater than or equal to a predetermined specified time.

2. The throttle control system according to claim 1, wherein the specific gear is a gear that rotates integrally with the driven shaft.

3. The throttle control system according to claim 1, wherein
among the gears, one or more gears selected from the specific gear and a gear existing between the specific gear and the electric motor on a transmission path of torque from the electric motor to the driven shaft are made of a plastic.

4. The throttle control system according to claim 1, wherein
the controller is configured to further execute an alarm process of outputting an alarm signal when the controller determines in the determination process that wear has occurred in the gear mechanism.

5. The throttle control system according to claim 1, wherein,
the controller stores values of the non-rotation time that correspond to a predetermined number of consecutive cycles in order from a latest one, and
the determination process includes determining that wear has occurred in the gear mechanism based on an average of the stored values of the non-rotation time corresponding to the multiple cycles being longer than or equal to the specified time.

6. A method of controlling a throttle device,
the throttle device including
an electric motor having a drive shaft;
a gear mechanism including a plurality of gears and configured to be driven by rotation of the drive shaft;
a driven shaft that is rotated by the gear mechanism;
a throttle valve configured to be selectively opened and closed by rotation of the driven shaft;
a rotation sensor configured to acquire an angular position of a specific gear that is one of the gears; and
a spring mechanism configured to urge the specific gear such that the angular position agrees with a predetermined initial position when receiving no torque from the electric motor or the driven shaft,
the method comprising:
executing a driving process of driving the electric motor such that a target angular position of the specific gear continues to increase beyond or decrease below the initial position; and
determining that wear has occurred in the gear mechanism based on that a non-rotation time in which the angular position detected by the rotation sensor does not change during execution of the driving process is greater than or equal to a predetermined specified time.

* * * * *